Feb. 25, 1969   R. H. GNAEDINGER   3,429,710
PRESSURE COOKING PROCESS TO PRODUCE FISH CAKES FOR ANIMAL USE
Filed Oct. 20, 1965

INVENTOR
RICHARD H. GNAEDINGER
BY
ATTORNEYS

United States Patent Office 3,429,710
Patented Feb. 25, 1969

3,429,710
PRESSURE COOKING PROCESS TO PRODUCE FISH CAKES FOR ANIMAL USE
Richard H. Gnaedinger, Ann Arbor, Mich., assignor to The United States of America as represented by the Secretary of the Interior
Filed Oct. 20, 1965, Ser. No. 499,114
U.S. Cl. 99—7                                        2 Claims
Int. Cl. A23k 1/10

ABSTRACT OF THE DISCLOSURE

Ground raw fish is rapidly passed, as a thin layer, through a cooking zone wherein steam is passed in contact therewith through the bottom and top surfaces of the fish layer to heat the fish to above 180° F. The cooked fish is then compressed into a cake. Harmful bacteria and enzymes such as thiaminase are destroyed by the proper duration of heating during the cooking and compressing steps.

---

The invention herein described and claimed may be manufactured and used by or for the Government of the United States of America for governmental purposes without the payment of royalties thereon or therefor.

This invention relates to a method and apparatus for treating low human food-value fish.

Species of fish in certain parts of the world have changed gradually over the years. For example, in the Great Lakes region fish of high human food-value have almost disappeared and have been replaced by less desirable species, known as rough fish, not suitable for human food. However, the animal food market represents a very large outlet for these less desirable fish, but many factors have prevented economic success in this area.

One example of the failure of full economic exploitation of rough fish in the animal food market is present in the pet-food industry, which uses large amounts of these fish. However, this market frequently becomes glutted due to the seasonal nature of the fisheries. If the excess fish are frozen during glut periods and stored for subsequent use, they undergo a gradual lowering of quality which makes the fish undesirable to the industry. Storage of large quantities of fresh fish presents economic barriers itself.

Mink farms provide another potentially large outlet for these fish since raw fish are generally regarded as an excellent food supplement for animals. However, mink ranchers do not routinely accept these raw fish because:

(1) The composition of fish often varies seasonally which necessitates constant changes in ration formulation;

(2) Regular supplies of fresh fish cannot be had owing to the seasonal nature of the fisheries;

(3) Frozen raw fish, stored to compensate for off-seasonal slack, undergoes an undesirable gradual lowering of quality;

(4) Many of these fish contain the enzyme, thiaminase, which destroys thiamin (valuable health vitamin $B_1$). Such fish are avoided by mink ranchers, some of whom cook all their fish as a preventative measure against thiaminase contamination and against other harmful enzymes and bacteria contamination, before serving the fish to their minks. These cooking methods often are not adequate to ensure destruction of all harmful enzymes, and often lower the quality of even fresh fish. These rough fish also represent a good food source for zoo animals, but the problems, economic and otherwise, that are encountered with the feeding of minks are also encountered with zoo animals, thereby restricting the desirability of these fish in this market, also.

Another possible utilization for these fish is in the manufacture of fish meal for poultry and swine, but this type of operation requires an initial investment too large for the individual fisherman. Also, the profitable operation of such a plant requires a large and sustained supply of raw material, a requirement, as stated previously, that is difficult to attain from fish due to the nature of the fish harvesting methods. Further, most of the raw fish would have to be transplanted to the plant, which would obviously increase material costs to the processor.

The object of this invention is to provide a method and apparatus for economically processing these rough fish in order to produce a form of fish very desirable to the animal food market. More specifically, the object of this invention is to provide a quality, uniform, stable, easily storable, non-thiaminase-active product by an inexpensive cooking process and apparatus that can be operated at dockside or aboard ship.

For a more detailed understanding of the invention and for further objects and advantages thereof, reference is to be had to the accompanying drawings, in which.

Figure 1:
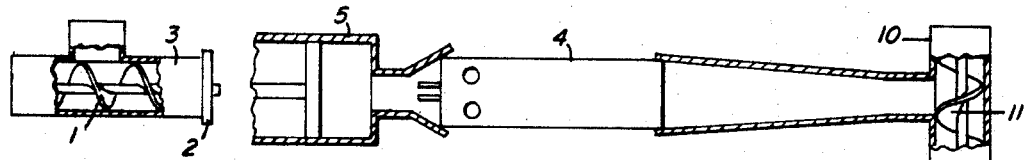
FIG. 1 is a schematic diagram showing a system embodying the invention.
Figure 2:
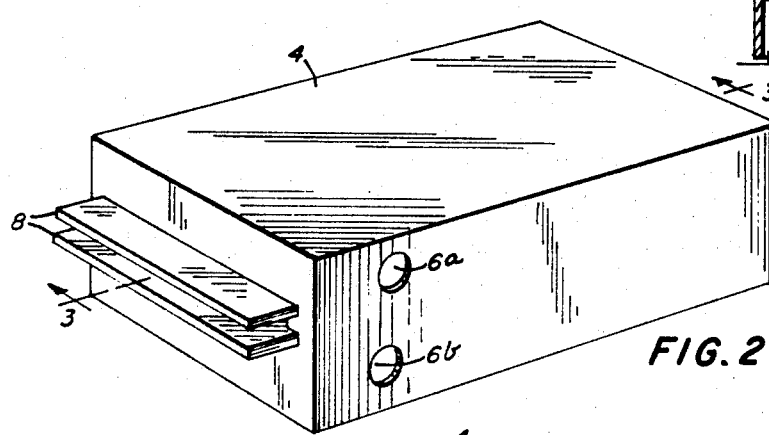
FIG. 2 shows the cooker of the present invention.
Figure 3:
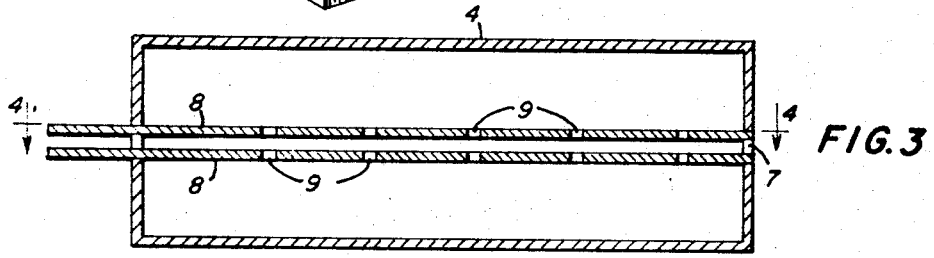
FIG. 3 shows a side sectional view of the cooker.
Figure 4:
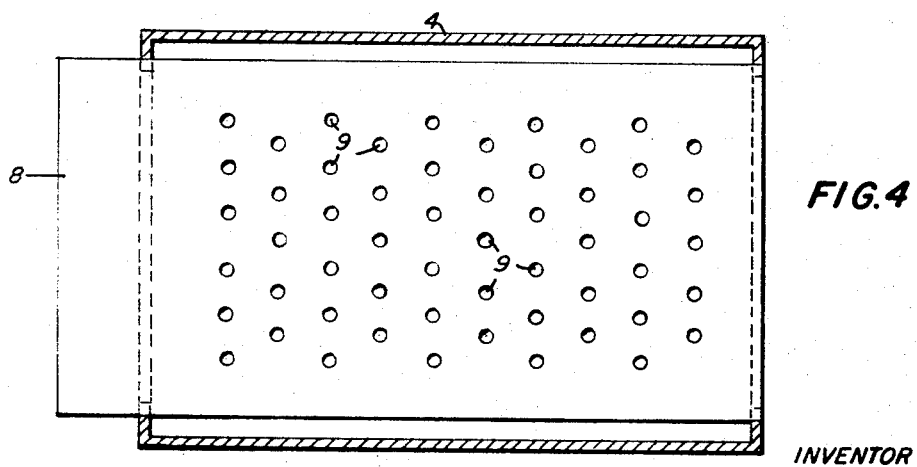
FIG. 4 shows a top view of one of the fish-containing plates in the cooker.

Referring to the drawings, raw fish is conveyed by a helical screw 1 through a perforated plate 2 with ¼ inch diameter holes in meat-type grinder 3. The ground fish is then fed into the cooking chamber 4 by a feed mechanism such as a piston-type sausage stuffer 5. Other feeding mechanisms such as a gear pump are also suitable. As shown in FIGS. 2 and 3, the rectangular shaped cooking chamber 4 contains heating steam inlets 6a and 6b. Other geometrical configurations for the chamber are obviously suitable. Stuffer 5 forces the ground fish between two closely spaced perforated metal plates 8 protruding from chamber 4, the plates spaced apart, for example, ½ inch. Fish and steam exit from the chamber through outlet 7. As shown in FIGS. 3 and 4, the closely spaced plates extrude the ground fish into a thin layer before it enters the cooking chamber 4, and the plates maintain the fish in a thin layer while it is contacted with jets of live steam delivered uniformly through perforations 9 to both sides of the ground material as it passes through chamber 4. Under this arrangement, the ground material can be heated rapidly to relatively high temperatures to destroy harmful bacteria and enzymes including thiaminase, as opposed to slow heating processes which can result in loss of valuable elements in the fish, and which can increase the formation of undesirable odors and flavors. One pound of raw fish can be heated up to 180° F. in less than one minute during continuous passage through the cooking chamber of the present invention. Once the raw fish enters the cooking chamber, the steam pressure within the chamber aids in moving the material through the rest of the chamber past outlet 7. Referring back to FIG. 1, material emerging from cooking chamber 4 is ground by, for example, a meat-type grinder 10 containing a helical screw 11 and perforated plate 12 with ½ inch diameter holes. Grinder 10 further makes it possible to regulate the rate of flow of fish through the cooking chamber thereby controlling the rate of cooking. Cooked fish emerging from the grinder 10 falls directly into a press cage 13 and is pressed, for example, for 5 minutes at a pressure of 10 to 15 p.s.i.g. To minimize loss of heat during filling and pressing, the cage is insulated. Pressed material is the form of a cake is packed in plastic bags and allowed to cool at room temperature for about 1 hour before being frozen. Immediate packaging of the hot material minimizes contamination of the product during subsequent handling.

To enable compression of the fish in the press cage the rough fish must be cooked sufficiently. A minimum temperature of 180° F. for the cooked product is necessary to achieve this.

In order to destroy the undesirable thiaminase enzyme that is present in most rough fish, the cooked fish must be held at 180° F. or above for several minutes (e.g. 5–10 minutes) during the process. The maximum operating temperature in the cooking chamber is only determined by the temperatures to which different fish can be brought without burning of the fish and destruction of valuable vitamins, etc. These cooking operations can be elevated to as high as 250° F. for most fish. A saturated steam pressure of 15 p.s.i.g. in the cooking chamber is suitable for the process of the present invention. If the feed rate is a few pounds per minute through a cooker with a capacity for approximately two pounds of fish, the desirable thiaminase destroying time-temperature relationship can be accomplished by operating the cooking chamber at such a temperature so that the temperature of the compressed cooked fish is still at 180° F. or above. Rather than sending the fish through at a constant feed rate under variable cooking chamber temperatures, to attain the desired product temperature the feed rate may obviously be varied and the cooking chamber temperature may be held constant. Many variables must be considered in regard to the cooking rate such as the temperature of the feed material, particle size of the feed material, the distance between the plates in the cooking chamber (i.e. the thickness of the fish layer during cooking), the number of perforations in the plates, the steam pressure.

No matter what particular rough fish is employed as the feed material, the press-cake produced by the process of this invention is of a relatively uniform composition. Such a non-thiaminase-active, uniform product is more desirable to mink ranchers and other animal food outlets for reasons stated previously. Note the following table in respect to uniformity:

Only ½ the storage space required by raw fish is required by the press-cake product, and the stored product is more stable than the raw fish since undesirable enzymes, bacteria, etc., have been destroyed by cooking thereby preserving the desirable qualities of the original fish. This capability of the press-cake product makes it highly suitable for storage during glut seasons.

Readily available equipment can be used for the process, except for the cooker which must be constructed separately at a cost that can be borne by relatively small private enterprise, which enterprises are characteristic of many fisheries. This process needs to be in operation only at times when fresh fish are being landed and can be readily shut down during idle periods without incurring prohibitive depreciation expenses. Salable products are obtained from the press liquor produced in the press cage, thereby defraying part of the operational costs.

In summary, the inexpensive rapid cooking system of the present invention preserves the desirable elements in the raw fish, destroys the undesirable elements, and yields a final product that can have great utility in the animal food market.

Although the particular process and apparatus described are well adapted to carry out the objects of the present invention, it is to be understood that various modifications and changes may be made all coming within the scope of the following claims.

What is claimed is:
1. A process for producing animal food from ground, raw, rough fish containing bacteria and enzymes including thiaminase harmful to animals consisting essentially of
    (a) moving a mass of said ground fish as a thin layer rapidly through a cooking zone, said thin layer configuration being defined by two substantially parallel surfaces on said mass, said ground fish being in the form of said thin layer throughout said cooking zone,
    (b) elevating the temperature of said ground fish in said cooking zone to at least 180° F. by uniformly passing steam into said mass simultaneously through both said substantially parallel surfaces of said thin layer mass,
    (c) moving said cooked fish out of said cooking zone,
    (d) compressing into a fish cake said cooked fish which has been moved out of said cooking zone, and
    (e) maintaining said cooked fish at said elevated temperature within the duration of said steps of cooking and compression to destroy said harmful enzymes and bacteria.
2. The process of claim 1 wherein said ground raw fish is extruded into said thin layer prior to entering said cooking zone.

TABLE.—PROXIMATE COMPOSITION OF FISH BEFORE AND AFTER PROCESSING

| Species [1] | Location | Percent | | | | | | | |
|---|---|---|---|---|---|---|---|---|---|
| | | Moisture | Protein | Oil | Ash | Moisture | Protein | Oil | Ash |
| Alewife | Lake Michigan | 72.16 | 12.04 | 12.64 | 2.57 | 64.30 | 19.52 | 7.80 | 4.71 |
| Do | do | 74.31 | 12.75 | 12.35 | 2.75 | 67.30 | 17.64 | 8.02 | 4.17 |
| Do | do | 74.90 | 11.99 | 8.60 | 2.73 | 66.96 | 18.10 | 7.14 | 4.70 |
| Do | do | 72.16 | 12.11 | 10.71 | 2.73 | 68.29 | 17.14 | 7.36 | 4.03 |
| Crap | Lake Erie | 64.4 | | 16.2 | | 63.1 | | 7.1 | |
| Do | do | 61.05 | | 20.51 | 2.94 | 61.43 | | 9.83 | 5.99 |
| Bloater chub | Lake Michigan | 69.13 | 12.76 | 14.56 | 2.17 | 65.29 | 20.45 | 7.65 | 3.68 |
| Gulf fish | Gulf of Mexico | 73.87 | 14.56 | 4.50 | 4.26 | 63.73 | 21.80 | 4.22 | 6.14 |
| Gizzard shad | Arkansas | 72.44 | 13.74 | 11.90 | 2.70 | 62.74 | 21.64 | 8.52 | 5.84 |
| Gizzard shad (5.8 fish/lb.) | Lake Erie | 62.67 | 12.09 | 22.25 | 2.19 | 62.98 | 18.67 | 10.11 | 3.53 |
| Gizzard shad (36.5 fish/lb.) | do | 70.58 | 12.01 | 14.16 | 2.24 | | | | |
| American smelt | Lake Superior | 81.57 | 11.85 | 2.34 | 1.99 | 70.90 | 18.04 | 4.13 | 3.13 |
| Do | Lake Erie | 75.54 | 12.71 | 7.60 | 2.01 | 68.87 | 18.79 | 6.35 | 2.70 |

[1] Alewife, *Pomolobus pseudoharengus;* carp, *Cyrinus carpio;* bloater chub, *Coregonus hoyi;* gizzard shad, *Dorosoma cepedianum;* American smelt, *Osmerus mordax;* Gulf fish, mixture of—king whiting, *Mentricirrhus americanus,* cutlassfish, *Trichiurus lepturus;* spot, *Leiostomus nothus;* croaker, *Micropogon undulatus;* sea robin, Pronotus sp.

References Cited

UNITED STATES PATENTS

| 1,421,283 | 6/1922 | Meakin | 99—235 |
| 1,922,783 | 8/1933 | Schmidt | 53—18 |
| 2,848,332 | 8/1958 | Fabish | 99—93 |
| 2,873,194 | 2/1959 | Wilkinson et al. | 99—188 |

A. LOUIS MONACELL, *Primary Examiner.*

R. M. ELLIOTT, *Assistant Examiner.*

U.S. Cl. X.R.

99—111